United States Patent [19]
Beau

[11] Patent Number: 5,827,993
[45] Date of Patent: Oct. 27, 1998

[54] PYROTECHNIC IGNITION DEVICE FOR A GAS GENERATOR

[75] Inventor: Jean-Francois Beau, Saint-Ouen L'Aumone, France

[73] Assignee: Societe Nationale Industrielle et Aerospatiale, Paris, France

[21] Appl. No.: 629,571

[22] Filed: Apr. 9, 1996

[30] Foreign Application Priority Data

Apr. 20, 1995 [FR] France ................................. 95 04713

[51] Int. Cl.⁶ .............................. C06C 7/00; F42C 19/08; C06D 5/00
[52] U.S. Cl. ....................... 102/202; 102/275.6; 102/380; 102/530; 60/39.821; 60/256; 244/3.22; 244/169
[58] Field of Search ................................. 102/202, 275.6, 102/380, 530, 531; 60/39.821, 39.823, 256; 244/169, 3.22; 280/741

[56] References Cited

U.S. PATENT DOCUMENTS

| | | |
|---|---|---|
| 2,475,875 | 7/1949 | Burrows et al. . |
| 3,423,931 | 1/1969 | Schwarz et al. ........................... 60/256 |
| 4,630,539 | 12/1986 | Thorn et al. ............................ 102/202 |
| 4,699,400 | 10/1987 | Adams et al. ....................... 102/275.5 |
| 4,850,274 | 7/1989 | Brede et al. .............................. 102/202 |
| 5,113,763 | 5/1992 | Schoeyer et al. ........................ 102/202 |
| 5,192,829 | 3/1993 | Suire ....................................... 102/434 |

FOREIGN PATENT DOCUMENTS

| | | |
|---|---|---|
| 0296053 | 12/1988 | European Pat. Off. . |
| 0419319 | 3/1991 | European Pat. Off. . |
| 2296834 | 7/1976 | France . |
| 2367659 | 5/1978 | France ................................. 244/3.22 |
| 2584141 | 1/1987 | France . |
| 2679994 | 5/1993 | France . |
| 2328958 | 1/1975 | Germany . |
| 181952 | 11/1982 | Japan ................................. 60/39.823 |
| WO 91/03638 | 3/1991 | WIPO . |

*Primary Examiner*—Harold J. Tudor
*Attorney, Agent, or Firm*—Fisher,Christen&Sabol

[57] ABSTRACT

A pyrotechnic ignition device for a gas generator (G), in which: (i) at least in the vicinity of the primary charge (CP), the transmission line (L) is at least substantially perpendicular to the longitudinal axis (X—X) of the outer case (E) of the generator (G); (ii) the end of the transmission line, provided with a deflagrating terminal lead charge (r), emerges in a sealed intermediate chamber (CI); and (iii) the intermediate chamber (CI) is connected to the primary charge (CP) via at least one throttling vent (e) having an axis (1—1) at least approximately parallel to the longitudinal axis (X—X) of the outer case (E).

13 Claims, 4 Drawing Sheets

PYROTECHNIC IGNITION DEVICE FOR A GAS GENERATOR

The present invention relates to a pyrotechnic ignition device for a gas generator, intended, for example, to be used as a thruster, trajectory deviator, actuator (gas-operated cylinder actuator), etc.

The device in accordance with the present invention is applicable most particularly, but not exclusively, in the space field.

Such gas generators are already known, these comprising an outer case having a longitudinal axis, provided with at least one gas outlet (nozzle) located at one end of said outer case, and containing a gas-emitting combustible primary charge formed, for example, by one or more blocks of solid propellant.

In these known gas generators, an ignition device is generally provided which comprises at least one transmission line located between an ignition control member (detonator or striking pin) and said primary charge, and the transmission line is provided, at its end pointing toward said primary charge, on that side of the latter which is opposite the gas outlet, with a detonating terminal lead charge.

Such a transmission line is advantageous for enabling the ignition control member to be located at appropriate points remote from the generator, as well as for arranging various safety devices along said line.

In the pyrotechnic ignition devices of the type described hereinabove, it is usual to provide at least one shock-wave-functioning initiation device between the detonating terminal lead charge of the transmission line and said primary charge of the generator, this shock-wave-functioning initiation device comprising a deflagrating lead charge, on the side where the primary charge of the generator is. In such a pyrotechnic ignition device, the shock wave generated by said detonating terminal lead charge serves said shock-wave-functioning device in igniting said deflagrating lead charge which, in its turn, ignites said primary charge of a gas generator. In addition, the shock-wave-functioning initiation device ensures gastightness between the transmission line and the gas generator.

Ignition devices of this type function correctly but they have the drawback of having one or more shock-wave-functioning initiation devices which complicate the firing chain and considerably increase the overall size and cost thereof.

It should be pointed out that, in order to try to avoid this drawback, it would be useless to imagine purely and simply eliminating the shock-wave-functioning initiation device or devices. This is because, in the case of such an elimination, the primary charge of the gas generator would be directly subjected to the shock wave from the detonating terminal lead charge or charges of the transmission line or lines, which would result in the damage, by cracking, or the detonation of said primary charge, but not its ignition.

The subject of the present invention is a simple and low-cost pyrotechnic ignition device having excellent reliability, but from which all the shock-wave-functioning initiation devices have been removed.

For this purpose, according to the invention, the pyrotechnic ignition device for a gas generator, which comprises:

an outer case having a longitudinal axis, provided with at least one gas outlet located at one end of said outer case and containing a gas-emitting combustible primary charge; and at least one transmission line located between an ignition control member and said primary charge, said transmission line being provided, at its end pointing toward said primary charge, on that side of the latter which is opposite the gas outlet, with a detonating terminal lead charge, is noteworthy in that:

at least in the vicinity of said primary charge, said transmission line is at least substantially perpendicular to said longitudinal axis of said outer case;

said end of the transmission line, provided with said detonating terminal lead charge, emerges in a sealed intermediate chamber; and said intermediate chamber is connected to said primary charge via at least one throttling vent having an axis at least approximately parallel to said longitudinal axis of said outer case; so that on firing said detonating terminal lead charge, said throttling vent, on the one hand, forms a barrier to transmission of the shock wave generated by said detonating terminal lead charge and, on the other hand, directs and concentrates the flow of high-temperature, high-pressure gas, also generated by said detonating terminal lead charge, toward said combustible primary charge.

Thus, because of the presence of said throttling vent and the perpendicular arrangement of the transmission line and said throttling vent, the combustible primary charge is protected from the detonation wave created by the detonating terminal lead charge of the transmission line or lines. This is because, on the one hand, the shock wave generated by said detonating terminal lead charge propagates mainly along the extension of said transmission line so that it does not reach, or barely reaches, said throttling vent and, on the other hand, said throttling vent forms a barrier to transmission of said shock wave. On the other hand, the flow of high-temperature, high-pressure gas, also generated by said detonating terminal lead charge, is directed and concentrated by said throttling vent toward said combustible primary charge.

Said throttling vent therefore has two functions:

it protects the primary charge of the gas generator from the detonation wave created by the transmission lines; and it directs and concentrates the flame from the detonating terminal lead charges onto said primary charge to be ignited.

In addition, it may be stated that, in contrast to the prior technique mentioned hereinabove, in the pyrotechnic ignition device in accordance with the present invention, in order to ignite the primary charge of the generator, the gas flow generated by the detonating terminal lead charges is used and not the shock wave produced by the latter.

Advantageously, in order to reinforce the concentration of said gas flow and therefore to further improve the reliability of the ignition device, said intermediate chamber has a small volume compared to the internal cavity of said outer case containing said primary charge.

For redundancy purposes further increasing the reliability of the ignition device in accordance with the present invention, the latter may comprise two transmission lines emerging in opposite faces of said intermediate chamber, especially one facing the other.

Should it be necessary, in order to ensure perfect gastightness, a check valve is provided between said intermediate chamber and said primary charge, said valve allowing the gases to pass from said intermediate chamber to said generator and preventing said gases from returning from said generator to said intermediate chamber. Such a check valve may be located in said throttling vent.

Advantageously, said intermediate chamber is centered on the longitudinal axis of said outer case of the gas generator.

Moreover, it is possible to provide only a single throttling vent. In this case, it is preferable if the axis of this single throttling vent is coincident with the axis of said outer case of the gas generator.

As a variant, the ignition device in accordance with the present invention may comprise several throttling vents, which are then advantageously distributed around the axis of said outer case.

In practice, it is advantageous if said sealed intermediate chamber and said throttling vent are arranged in a set of pieces capable of closing off in a sealed manner that end of said outer case which is opposite said gas outlet and if said transmission line is fixed to said set of pieces by its end provided with said detonating terminal lead charge.

Moreover, it is possible to place a deflagrating intermediate charge between said throttling vent and said primary charge in order to facilitate ignition of this primary charge.

In this case, it is advantageous if said deflagrating intermediate charge for igniting said primary charge is carried by said set of pieces closing off said outer case.

In addition, the present invention relates to a gas generator especially adapted to the pyrotechnic ignition device described hereinabove.

For this purpose, according to the present invention, the gas generator, comprising an outer case having a longitudinal axis, provided with at least one gas outlet located at one end of said outer case and containing a gas-generating combustible primary charge, is noteworthy in that it comprises:

an intermediate chamber, which is connected to said primary charge via at least one throttling vent having an axis at least approximately parallel to said longitudinal axis of said outer case; and means for fixing that end of at least one ignition transmission line which is provided with a detonating terminal lead charge to said intermediate chamber in such a way that, at least in the vicinity of said primary charge, said transmission line is at least substantially perpendicular to said longitudinal axis of said outer case and so that said end of said transmission line emerges in said sealed intermediate chamber.

Of course, the gas generator in accordance with the present invention may comprise technical features which relate to it and which are mentioned hereinabove with regard to the pyrotechnic ignition device of the invention.

Advantageously, for redundancy purposes, the gas generator comprises means for fixing two opposed ignition transmission lines to said intermediate chamber.

In addition, by virtue of this arrangement, a set of gas generators capable of being ignited by a common ignition control member may be easily formed.

Thus, in this case, said gas generators may be placed in series in such a way that:

each intermediate gas generator is connected, via opposed ignition transmission lines, respectively to the previous gas generator and to the next gas generator in the series; and each of the end gas generators is connected, via opposed ignition transmission lines, respectively to the adjacent gas generator in the series and to said common ignition control member.

It should be pointed out that such an arrangement is particularly advantageous, in particular if it is compared to the known prior technique of pyrotechnic ignition systems using shock-wave-functioning initiation devices. This is because this prior technique requires multichannel relays, with respect to which the gas generators are mounted in parallel., each of them by means of two transmission lines (for redundancy). By virtue of the present invention, the multichannel relays are eliminated and fewer transmission lines are used for at least equivalent reliability.

The figures of the appended drawing will make it clearly understood how the invention may be realized. In these figures, identical references designate similar elements.

FIG. 1 is a diagrammatic view illustrating one embodiment of a known pyrotechnic ignition device, associated with a gas generator and intended to be improved by implementation of the present invention.

FIGS. 2 and 3 diagrammatically illustrate two alternative embodiments of the device in accordance with the present invention.

Figure 1:
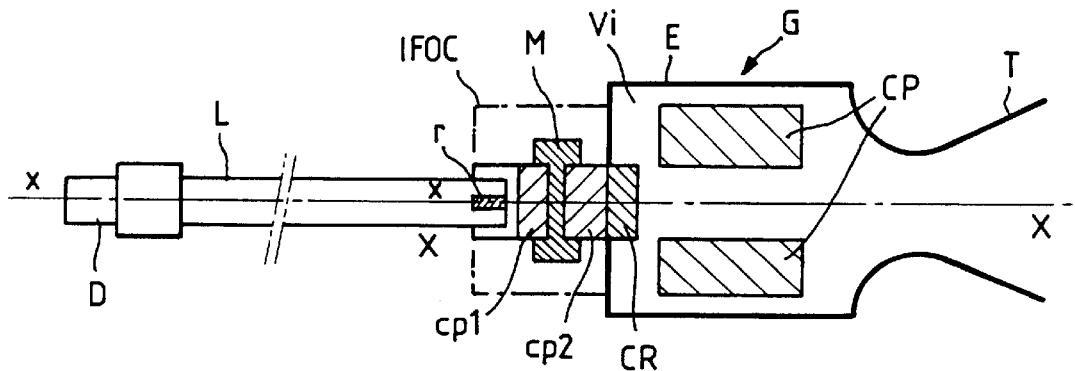

FIG. 1 shows a known gas generator G comprising an outer case E having a longitudinal axis X—X. At one of its longitudinal ends, the outer case E comprises a gas outlet nozzle T. The internal cavity Vi of the outer case E contains a gas-generating combustible primary charge CP consisting, for example, of one or more blocks.

Associated with the gas generator G is an ignition device comprising an ignition control member D consisting, for example, of a detonator or striking pin. The ignition control member D is connected to the generator G via at least one transmission line L comprising, at its end pointing toward the primary charge CP, a detonating terminal lead charge r.

A shock-wave-functioning initiation device IFOC is placed between the end of the transmission line L comprising the detonating terminal lead charge r and the primary charge CP of the generator G. This device IFOC comprises two detonating primary charges cp1, cp2 which are separated from each other by a metal wall M and, between the detonating primary charge cp2 and the primary charge CP, a deflagrating lead charge CR. At least in the vicinity of the generator G, the axis x—x of the transmission line L is parallel (if there are several lines L) or coincident (if the line L is the only one) with the axis X—X of the outer case E.

Thus, when the ignition control member D is actuated, the pyrotechnic order is transmitted via the transmission line L to the detonating terminal lead charge r. The latter acts as a detonator, detonating the primary charge cp1. The shock wave generated by the charges r and cp1 is transmitted, along the extension of said transmission line L, through the metal wall M to the detonating primary charge cp2 which ignites the deflagrating lead charge CR which, in turn, fires the primary charge CP.

Figure 2:
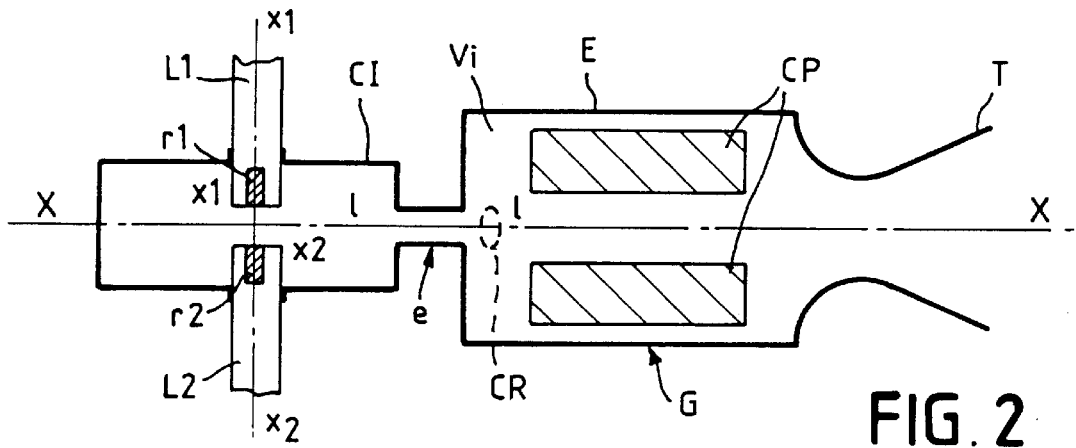
Figure 3:
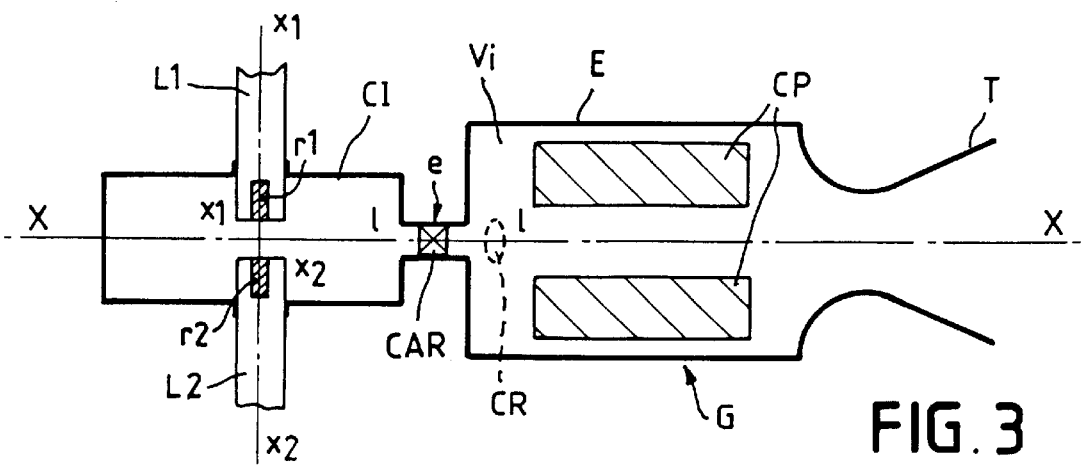

In the embodiments in accordance with the invention which are shown in FIGS. 2 and 3, the generator G illustrated by FIG. 1 is reproduced. However, in this case, the device IFOC has been omitted and replaced by an intermediate chamber CI, the axis of which is coincident with the axis X—X and which is connected to that end of the outer case E which is opposite the nozzle T via a single throttling vent e. The volume of the intermediate chamber CI is small compared to that of the internal cavity Vi of the outer case E.

These FIGS. 2 and 3 show two transmission lines L1 and L2, each similar to the transmission line L in FIG. 1 and connected to the ignition control member D. In addition, at least in the vicinity of the intermediate chamber CI, the axes x1—x1 and x2—x2 of the two transmission lines L1 and L2 are perpendicular to the axis X—X of the outer case E. The axis l—l of the single throttling vent e shown is coincident with the axis X—X of the outer case E.

When the detonating terminal lead charges r1 and r2 are ignited by the corresponding transmission line L1 or L2, they generate high-pressure, high-temperature gases. These gases are expanded in the intermediate chamber CI and transmitted to the primary charge CP of the generator G via the throttling vent e.

As a result of the perpendicular arrangement of the transmission lines L1 and L2 with respect to the axis l—l of the throttling vent e, and of the narrowness of the passage formed by said throttling vent, it may be easily understood that the primary charge CP is protected from the detonation waves generated by the detonating terminal lead charges r1 and r2 along the extension of said lines L1 and L2. In contrast, the throttling vent e directs and concentrates the high-pressure, high-temperature gases, also generated by the detonating terminal lead charges r1 and r2, onto the primary charge CP, which is therefore ignited. Optionally, a deflagrating lead charge CR is provided between the throttling vent e and the primary charge CP.

As shown in FIG. 3, in order to prevent any gases returning from the generator G to the intermediate chamber CI, it is possible to provide between the latter and the generator G, for example in the throttling vent e, a check valve CAR which allows the gases to pass from the intermediate chamber CI to the gas generator G but which prevents said gases returning from the generator G to the intermediate chamber CI.

Figure 4:
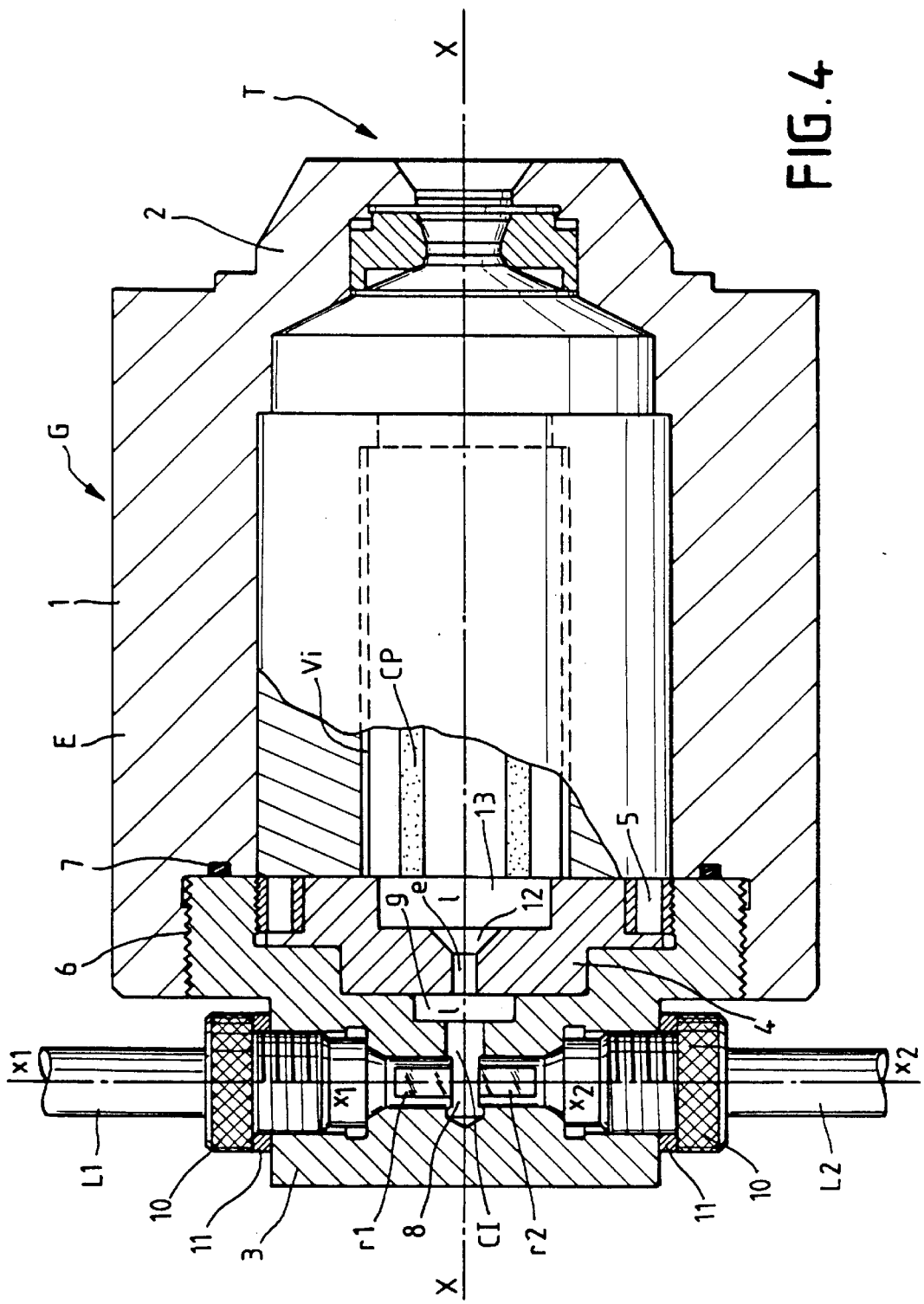
FIGS. 4 and 5 show, in longitudinal section, two practical embodiments of the device in accordance with the present invention.

FIG. 4 shows a practical embodiment of the device in FIG. 2, with a single throttling vent e, but without either a deflagrating lead charge CR or a check valve. In this embodiment, the primary charge CP of the generator G consists of a single solid block.

As may be seen, the outer case E comprises a cylindrical side wall 1 made as a single piece with an end wall 2, in which the nozzle T is made. This outer case E defines an internal cavity Vi, which is open on the side opposite the end wall 2 and in which the primary charge CP is positioned.

The other end wall of the outer case E is formed by the set of three pieces 3, 4 and 5.

The piece 3 is an obturator capable of being fitted onto the open end of the outer case E by screwing, by means of the cooperating threads 6. A seal 7, placed between the side wall 1 and the obturator 3, seals the internal volume Vi.

The intermediate chamber CI is formed by a bore 8 and a larger-diameter recess 9, these being machined centrally in said obturator 3. The ends of the transmission lines L1 and L2 are sealably fixed to the obturator 3 by means of screwable connectors 10 combined with seals 11.

The bore 8 and the recess 9 are closed off by the plate-shaped piece 4, fastened to said obturator 3, by the piece 5, taking the form of a threaded ring.

The plate 4 is drilled with the throttling vent e, a flare 12 in the latter and a larger-diameter recess 13. The flare 12 and the recess 13 act as an ignition diffuser.

The bore 8, the recess 9, the throttling vent e, the flare 12 and the recess 13 are aligned on the axis X—X of the outer case E. Their sequence constitutes the passage for the high-pressure, high-temperature gas flow, generated by the detonating terminal lead charges r1 and r2, toward the primary charge CP of the generator G.

Figure 5:
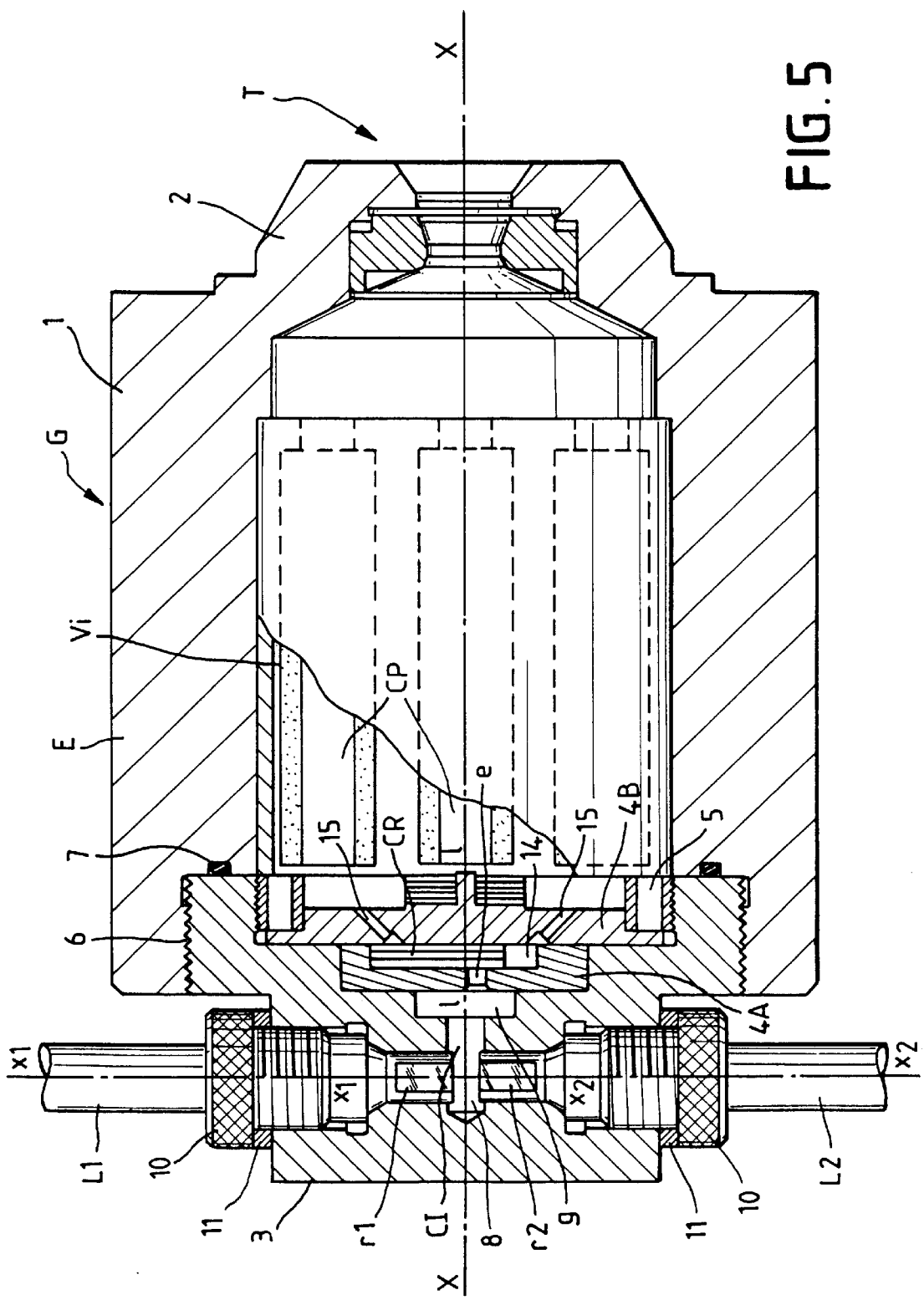

FIG. 5, in a view similar to FIG. 4, shows a practical embodiment of FIG. 2, with several throttling vents e and one or more deflagrating lead charges CR, but with no check valve. In this embodiment, the primary charge CP consists of several solid blocks, and again there are the elements 1 to 3 and 5 to 11 which were described hereinabove. In contrast, the piece 4 is subdivided into two parts 4A and 4B. The part 4A closes off the bore 8 and the recess 9 and is drilled so as to form several throttling vents e having axes parallel to the axis X—X and distributed around said axis X—X (only a single throttling vent e is visible in the section in FIG. 5). The part 4B is fixed to the obturator 3 by the ring 5 and blocks said part 4A against said obturator.

A housing 14 for one or more deflagrating lead charges CR is provided between the parts 4A and 4B and said housing 14 communicates with the internal cavity Vi of the outer case E via ignition diffusers 15.

The passage for the high-pressure, high-temperature gas flow then consists of the sequence of the bore 8, the recess 9, the throttling vents e, the housing 14 and the ignition diffusers 15.

Figure 6:
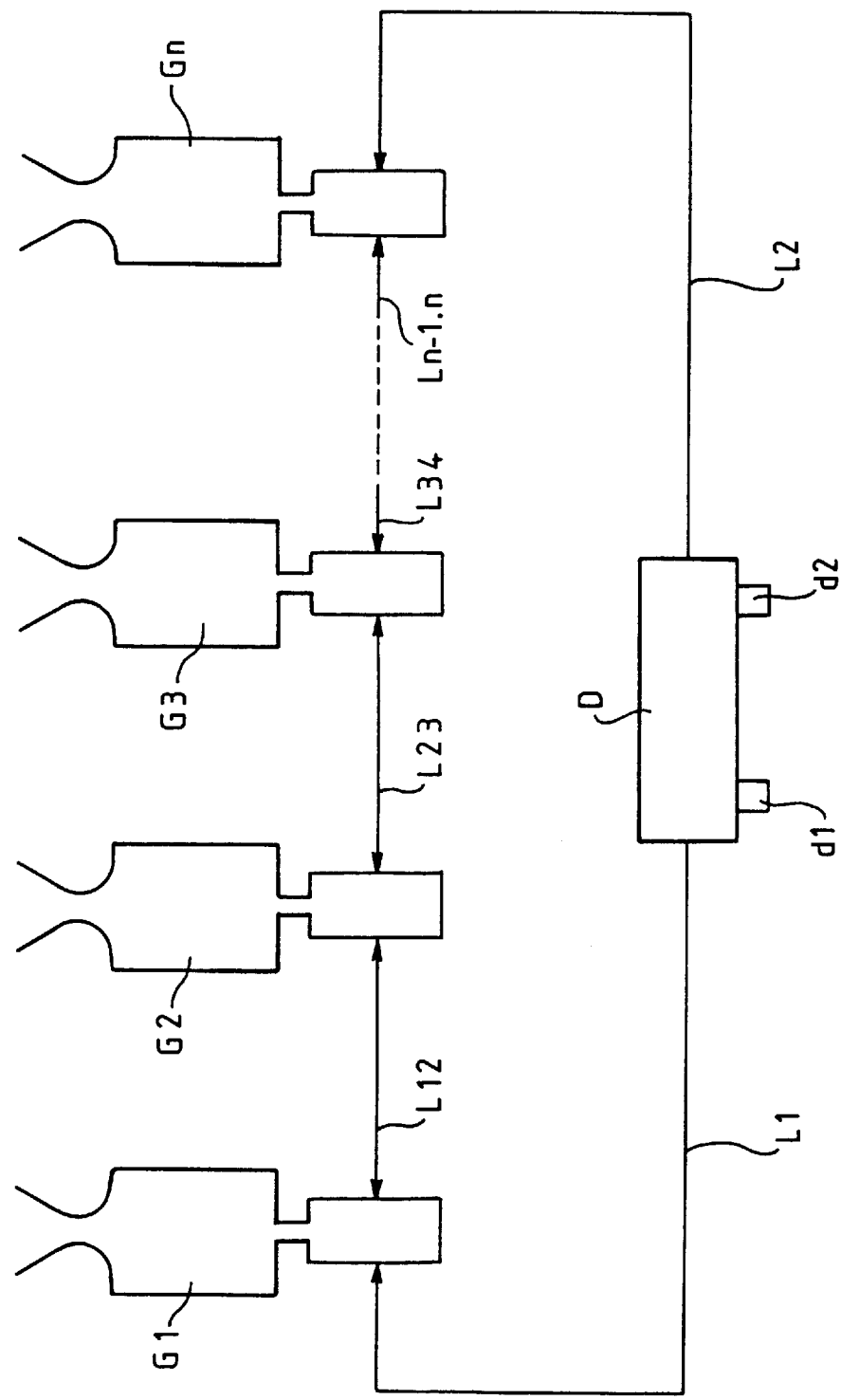
FIG. 6 shows a plurality of gas generators in accordance with the invention, mounted in series.

FIG. 6 shows a plurality of gas generators GI to Gn (each identical to the generator G described hereinabove), mounted in series. In this series:

each intermediate gas generator G2 to Gn−1 is connected, via opposed ignition transmission lines L12, L23, L34, . . . , Ln−1.n, respectively to the previous gas generator and to the next gas generator in the series; and each of the end gas generators Gi and Gn is connected, via opposed ignition transmission lines L12, L1 and Ln−1.n, L2, respectively to the adjacent gas generator in the series G2 or Gn−1 and to the common ignition control member D.

In the embodiment in FIG. 6, said common control member has two sensitive members d1 and d2, each receiving an ignition order. The two ignition orders propagate via the lines L1 and L2 and then via the lines L12, . . . , Ln−1.n. A simple system, with redundancy, for igniting a plurality of generators G1 to Gn is thus obtained.

We claim:

1. A pyrotechnic ignition device for a gas generator (G), which comprises:

an outer case (E) having a longitudinal axis (X—X), provided with at least one gas outlet (T) located at one end of said outer case (E) and containing a gas-emitting combustible primary charge (CP); and at least one transmission line (L) located between an ignition control member (D) and said primary charge (CP), said transmission line (L) being provided, at its end pointing toward said primary charge (CP), on that side of the latter which is opposite the gas outlet (T), with a detonating terminal lead charge (r), wherein:

at least in the vicinity of said primary charge (CP), said transmission line (L) is at least substantially perpendicular to said longitudinal axis (X—X) of said outer case (E);

said end of the transmission line, provided with said detonating terminal lead charge (r), emerges in a sealed intermediate chamber (CI); and said intermediate chamber (CI) is connected to said primary charge (CP) via at least one throttling vent (e) having an axis (l—l) at least approximately parallel to said longitudinal axis (X—X) of said outer case (E); so that on firing said detonating terminal lead charge (r), said throttling vent (e), on the one hand, forms a barrier to transmission of the shock wave generated by said detonating terminal lead charge (r) and, on the other hand, directs and concentrates the flow of high-temperature, high-pressure gas, also generated by said detonating terminal lead charge (r), toward said combustible primary charge (CP).

2. The pyrotechnic ignition device as claimed in claim 1, wherein said intermediate chamber (CI) has a smaller volume than the internal cavity (Vi) of said outer case (E) containing said primary charge (CP).

3. The pyrotechnic ignition device as claimed in claim 1, which comprises two transmission lines (L1 and L2) and in which said transmission lines emerge in opposite faces of said intermediate chamber (CI).

4. The pyrotechnic ignition device as claimed in claim 1, wherein a check valve is provided between said intermediate chamber (CI) and said primary charge (CP), said valve allowing the gases to pass from said intermediate chamber (CI) to said generator (G) and preventing said gases from returning from said generator (G) to said intermediate chamber (CI).

5. The pyrotechnic ignition device as claimed in claim 1, wherein said intermediate chamber (CI) is centered on the longitudinal axis (X—X) of said outer case (E).

6. The pyrotechnic ignition device as claimed in claim 1, wherein a single throttling vent (e) is provided and wherein the axis (l—l) of said single throttling vent is coincident with the axis (X—X) of said outer case (E).

7. The pyrotechnic ignition device as claimed in claim 1, which comprises several throttling vents (e) distributed around the axis (X—X) of said outer case (E).

8. The pyrotechnic ignition device as claimed in claim 1, wherein said sealed intermediate chamber (CI) comprises:
an obturator (3) attached to and closing off in a sealed manner that end of said outer case (E) which is opposite said gas outlet (T) and wherein said transmission line (L) is fixed to said obturator (3) by its end provided with said detonating terminal lead charge (r), said obturator (3) having a bore (8) connecting said end of the transmission line (L) provided with the detonating terminal lead charge (r) to said at least one throttling vent (e), and wherein said obturator (3) comprises a piece (4) fastened to said obturator (3) and located at that end of said outer case (E) which is opposite said gas outlet (T), said piece (4) being provided with said throttling vent (e).

9. The pyrotechnic ignition device as claimed in claim 1, which comprises a deflagrating intermediate charge (CR) for igniting said primary charge (CP), this intermediate charge being placed between said primary charge and said throttling vent.

10. The pyrotechnic ignition device as claimed in claim 8, wherein at least one deflagrating intermediate charge (CR) for igniting said primary charge (CP) is carried by said piece (4A).

11. A gas generator (G), comprising an outer case (E) having a longitudinal axis (X—X), provided with at least one gas outlet (T) located at one end of said outer case (E) and containing a gas-generating combustible primary charge (CP), which comprises:
an intermediate chamber (CI), which is connected to said primary charge (CP) via at least one throttling vent (e) having an axis (l—l) at least approximately parallel to said longitudinal axis (X—X) of said outer case (E); and
means (10) for fixing that end of at least one ignition transmission line (L) which is provided with a detonating terminal lead charge (r) to said intermediate chamber (CI) wherein, at least in the vicinity of said primary charge (CP), said transmission line (L) is at least substantially perpendicular to said longitudinal axis (X—X) of said outer case (E) and wherein said end (r) of said transmission line (L) emerges in said sealed intermediate chamber (CI).

12. The gas generator (G) as claimed in claim 11, which comprises means (10) for fixing two opposed ignition transmission lines (L1, L2) to said intermediate chamber (CI).

13. A set of n gas generators, wherein each of said set of n gas generators are as specified under claim 11, wherein said set of n gas generators are ignited by a common ignition control member (D), wherein said gas generators (G1 to Gn) are placed in series, wherein G1 and Gn are end generators and intermediate generators G2 to Gn−1 are between said end generators, and wherein:
each intermediate gas generator (G2 to Gn−1) is connected, via opposed ignition transmission lines, respectively to the previous gas generator and to the next gas generator in the series; and
each of the end gas generators (G1 and Gn) is connected, via opposed ignition transmission lines, respectively to the adjacent gas generator in the series and to said common ignition control member (D).

* * * * *